(12) United States Patent
Su et al.

(10) Patent No.: US 8,233,061 B1
(45) Date of Patent: Jul. 31, 2012

(54) SYSTEM, METHOD, AND COMPUTER PROGRAM PRODUCT FOR REDUCING A NUMBER OF REQUESTS REQUIRED TO RETRIEVE PORTIONS OF MEMORY

(75) Inventors: Zhiqiang Jonathan Su, San Jose, CA (US); Ming Liang Milton Lei, Stanford, CA (US); Rirong Chen, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 1460 days.

(21) Appl. No.: 11/757,241

(22) Filed: Jun. 1, 2007

(51) Int. Cl.
*G09G 5/00* (2006.01)

(52) U.S. Cl. .................... 348/239; 348/104; 345/581

(58) Field of Classification Search .................. 348/239; 345/581

See application file for complete search history.

(56) References Cited

U.S. PATENT DOCUMENTS

| | | | |
|---|---|---|---|
| 7,982,743 B2 * | 7/2011 | Cooper et al. | 345/581 |
| 2006/0082649 A1 * | 4/2006 | Gomila et al. | 348/104 |
| 2006/0083314 A1 * | 4/2006 | Cooper et al. | 375/240.25 |
| 2006/0083316 A1 * | 4/2006 | Cooper et al. | 375/240.25 |
| 2006/0115175 A1 * | 6/2006 | Cooper et al. | 382/260 |

* cited by examiner

*Primary Examiner* — Khanh Dinh
(74) *Attorney, Agent, or Firm* — Zilka-Kotab, PC

(57) ABSTRACT

A memory system, method, and computer program product are provided. In use, a plurality of portions of memory is arranged contiguously. Further, a number of requests required to retrieve the portions of memory is reduced utilizing the arrangement. In one possible embodiment, such technique may be used in the context of film grain technology (FGT), such that the portions of memory include portions of a film grain image stored in a film grain database (FGDB).

16 Claims, 6 Drawing Sheets

SYSTEM, METHOD, AND COMPUTER PROGRAM PRODUCT FOR REDUCING A NUMBER OF REQUESTS REQUIRED TO RETRIEVE PORTIONS OF MEMORY

FIELD OF THE INVENTION

The present invention relates to memory, and more particularly to accessing memory.

BACKGROUND

Film grain technology (FGT) is a video specification provided by the Society of Motion Picture and Television Engineers (SMPTE). FGT is capable of allowing, video output appear as film. In particular, FGT allows film grain to be added to decoded frames of such video. Utilizing FGT, the film grain is added to the frames e.g. bitstream, etc.) after the decoding of such frames, but prior to display.

Further, FGT utilizes a film grain database (FGDB). The FGDB is composed of 169 patterns of 4,096 film grain samples, where each film grain sample represents a 64×64-byte film grain image. Accordingly, the size of the FGDB is 64×64×169 (i.e. 692,224 bytes).

FIG. 1 illustrates a memory block 100 in which a film grain image is stored, in accordance with the prior art. As shown in FIG. 1, portions of memory 102 are stored serially within the memory block 100. Each portion of memory 102 thus includes a portion of the film grain image. Further, each portion of memory 102 is 4×1-bytes. Accordingly, a 64×64-byte film grain image is comprised of a plurality of 4×1-byte portions that are serially stored in memory. Moreover, each 4×1-byte portion may include 4 1×1-byte addresses stored therein.

Generally, for an 8×8-byte portion (e.g. of a Luma surface, Chroma surface, etc.), FGT requires an 8×8-byte sample from one 64×64-byte film grain image. The horizontal and vertical offsets within the 64×64-byte film grain image are traditionally calculated utilizing the formula shown in Table 1.

TABLE 1 k_offset = (MSB16(x(r, ec)) % 52)
k_offset &= 0xFFFC
k_offset += m & 0x0008
l_offset = (LSB16(x(r, ec)) % 56)
l_offset &= 0xFFF8
l_offset += n & 0x0008

As shown in Table 1, the (MSB16(x(r, ec)) and (LSB16(x(r, ec)) are calculated from a predefined random seed. In addition, the (m, n) is the coordinate of the top-left corner of the memory block 100 in a decoded frame. Since the memory block 100 stores portions thereof serially, at least eight (8) read requests must be utilized, where each read request is 8 bytes, in order to read an 8×8-byte portion of the memory block 100 (e.g. sixteen 4×1-byte portions of the memory block 100).

In use, the FGDB is generated by a software driver. Furthermore, such FGDB may be generated only once. FIG. 2 illustrates a method 200 for reading portions of memory stored serially in an FGDB, in accordance with the prior art. As shown in operation 202, a video driver generates an FGDB. Additionally, the FGDB is stored in memory, as shown in operation 204. As described above with respect to FIG. 1, portions of the film grain images are stored serially within the FGDB.

Still yet, as shown in operation 206, eight starting addresses within the FGDB are calculated. Such starting addresses may each be associated with one of the portions of the file grain image. Moreover, eight 8-byte read requests are issued with respect to such starting addresses in order to receive an 8×8-byte block of memory within the FGDB. See operation 208. In particular, the eight read requests are required due to the serial configuration of the portions of the film grain image within the FGDB (as shown in FIG. 1). Finally, FGT processes the 8×8-byte block of memory within the FGDB, as shown in operation 210.

To this end, a plurality of read requests (e.g. 8 read requests) must be issued in order to access a single 8×8-byte block of memory within the FGDB. Unfortunately, utilizing numerous read requests in this manner is inefficient, particularly for high performance processors [e.g. graphics processing units (GPUs), etc.] with high latency.

There is thus a need for addressing these and/or other issues associated with the prior art.

SUMMARY

A memory system, method, and computer program product are provided. In use, a plurality of portions of memory is arranged contiguously. Further, a number of requests required to retrieve the portions of memory is reduced utilizing the arrangement. In one possible embodiment, such technique may be used in the context of film grain technology (FGT), such that the portions of memory include portions of a film grain image stored in a film grain database (FGDB).

DETAILED DESCRIPTION

Figure 1:
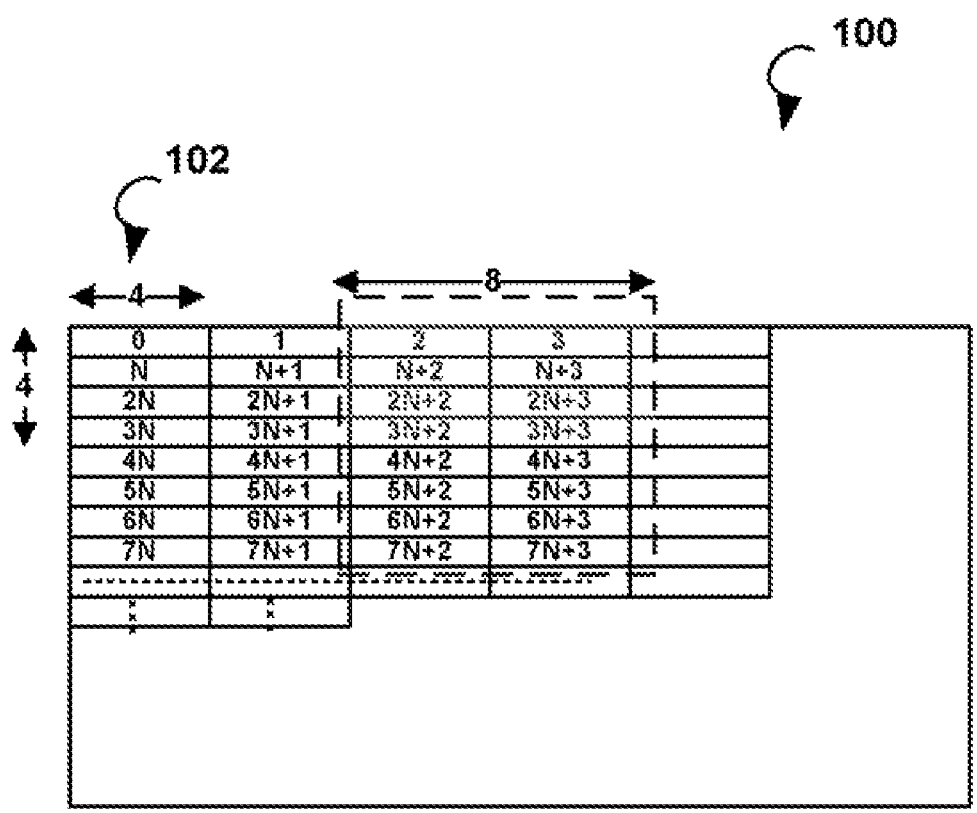
FIG. 1 illustrates a memory block in which a film grain image is stored, in accordance with the prior art.
Figure 2:
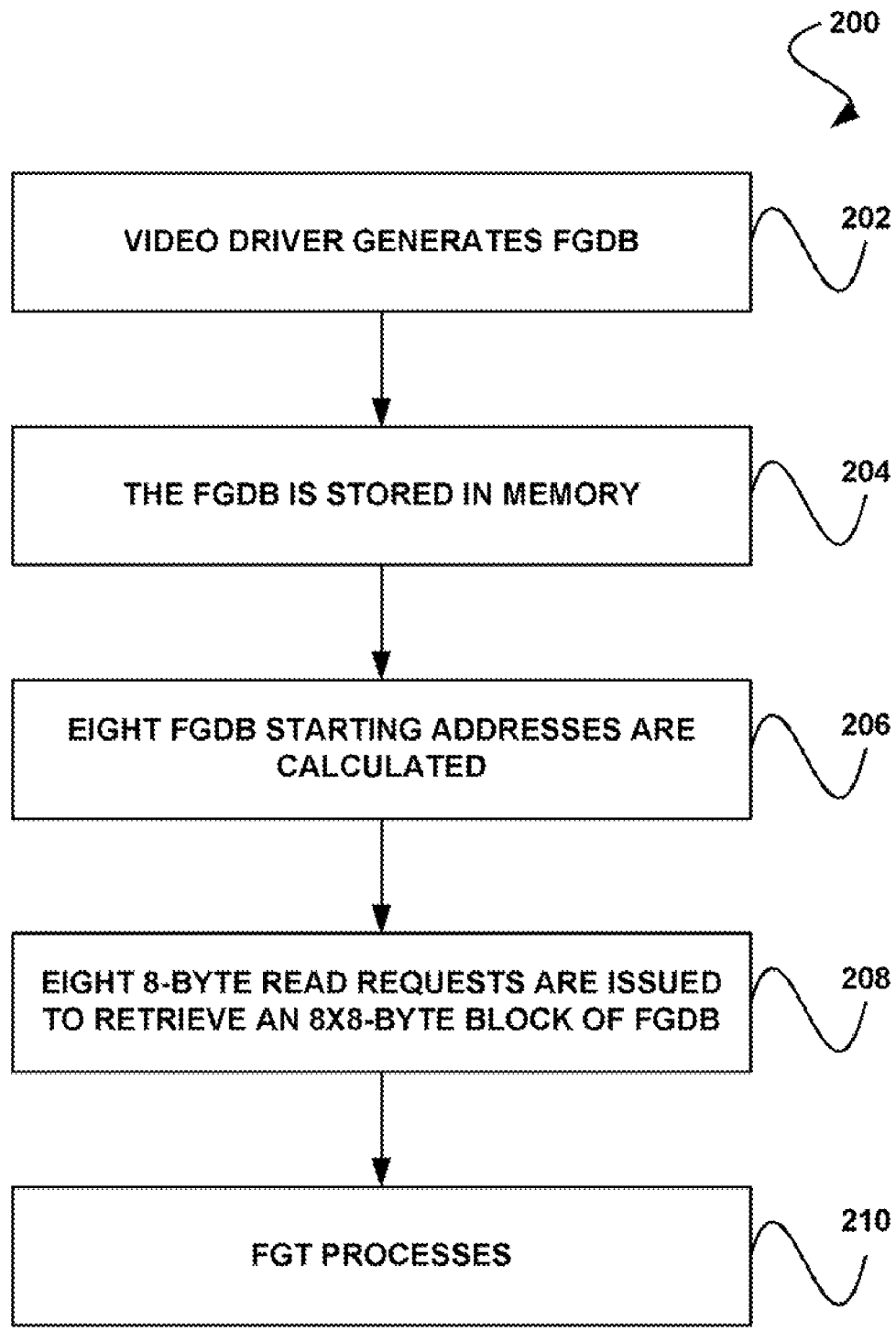
FIG. 2 illustrates a method for reading portions of memory stored serially in a film grain database (FGDB), in accordance with the prior art.
Figure 3:
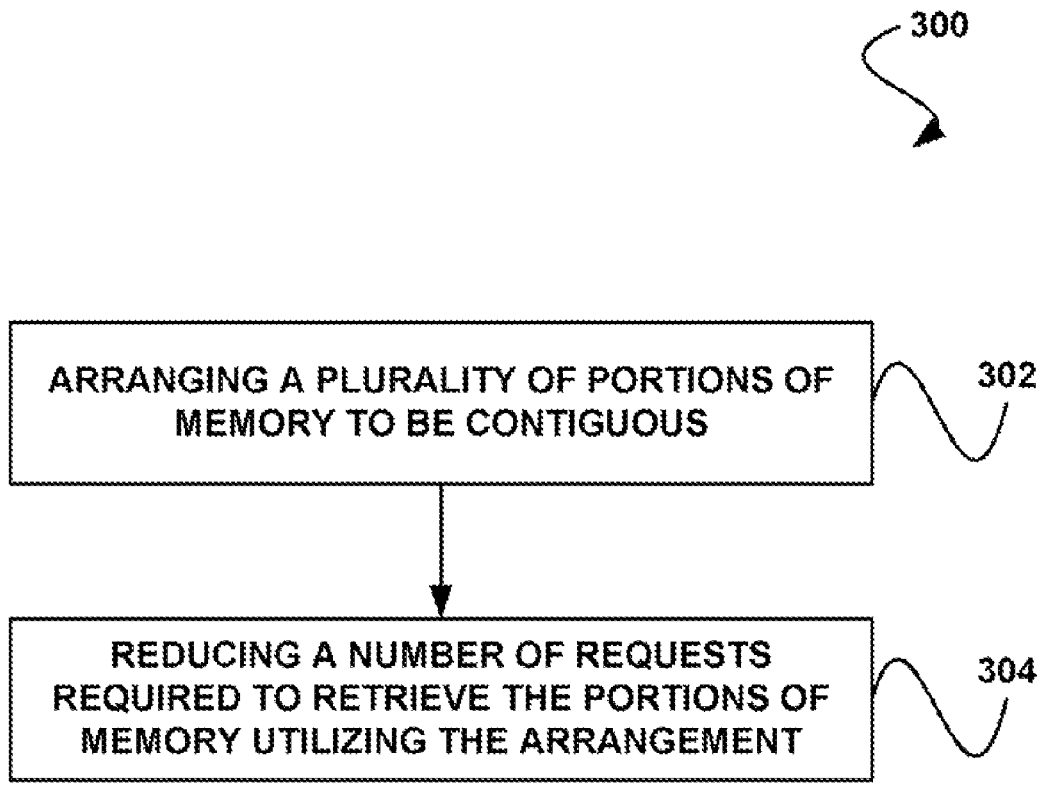
FIG. 3 illustrates a method for reducing a number of requests required to retrieve portions of memory, in accordance with one embodiment.

FIG. 3 illustrates a method 300 for reducing a number of requests required to retrieve portions of memory, in accordance with one embodiment. As shown in operation 302, a plurality of portions of memory is arranged contiguously. In the context of the present description, the memory may include any memory capable of storing data.

For example, the memory may include random access memory (RAM), read-only memory (ROM), etc. In one embodiment, the memory may include memory within a system (e.g. the memory system described below with respect to FIG. 6, etc.). Further, in another optional embodiment, the memory may include a film grain database (FGDB) which stores a plurality of film grain samples which each represent a film grain image. Thus, the memory may optionally include a film grain image stored within the FGDB.

In one embodiment, the portions of memory may include addresses within the memory. In another embodiment, the portions may each include a sample of an image (e.g. the film grain image, etc.) stored in memory. To this end, the portions of memory may each include a subset of a larger portion of memory.

Thus, in the context of the FGDB described above, the portions of operation 302 may include portions of at least one film grain image stored within the FGDB. In yet another embodiment, the portions of memory may each include a 4×4-byte block of memory. Accordingly, in one embodiment, the portions of memory may include sub-blocks within a larger block (e.g. 8×8-byte, 64×64-byte, etc.) of memory.

Further, the portions of memory are arranged contiguously (e.g. adjacently, bordering, adjoining, etc.) such that a plurality of portions may optionally be retrieved (e.g. read, accessed, etc.) as a block. Just by way of example, the portions may be arranged contiguously such that four 4×4-byte portions with sequential addresses stored therein may be retrieved as a single 8×8-byte block portion that comprises the four sequential 4×4-byte portions. Of course, however, the portions may be arranged contiguously in any desired manner that allows the reduction of the number of requests required to retrieve the same.

To this end, a number of requests required to retrieve the portions of memory is reduced, utilizing the arrangement. Note operation 304. In one embodiment, a single request may be utilized to retrieve an 8×8-byte block of the memory. In the exemplary embodiment described above, such 8×8-byte block of memory may include four contiguous 4×4-byte portions of the memory, where such portions of the memory include sequential addresses.

In another embodiment, each request may utilize a single address associated with one of the portions of memory, Just by way of example, an 8×8-byte block of memory, as described above, may be retrieved utilizing a single address. Further, such single address may identify a first (e.g. initial, beginning, etc.) portion of memory associated with the retrieval request.

Additionally, the requests may be issued utilizing a processor (e.g. graphics processor, etc.). In one embodiment, the processor ma be capable of issuing 64-byte requests. For example, a single 64-byte request may be capable of retrieving an 8×8-byte block of the memory, such as that described above. It should be noted, however, that the requests may be issued in any manner capable of retrieving portions of memory utilizing the contiguous arrangement thereof.

To this end, the contiguous arrangement of the portions of memory may allow a number of requests required to retrieve the portions of memory to be reduced. In one embodiment, such reduced number of requests may provide improved system performance for a system utilized in retrieving such portions of memory. For example, a single request identifying a first portion of memory may be utilized for retrieving a plurality of portions of memory contiguous to such first portion of memory.

In another embodiment, the reduced number of requests may also reduce an overall gate count associated with the retrieval of the portions of memory. Accordingly, processors that exhibit high performance and high latency may optionally perform processing functions with greater efficiency when retrieving portions of memory.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
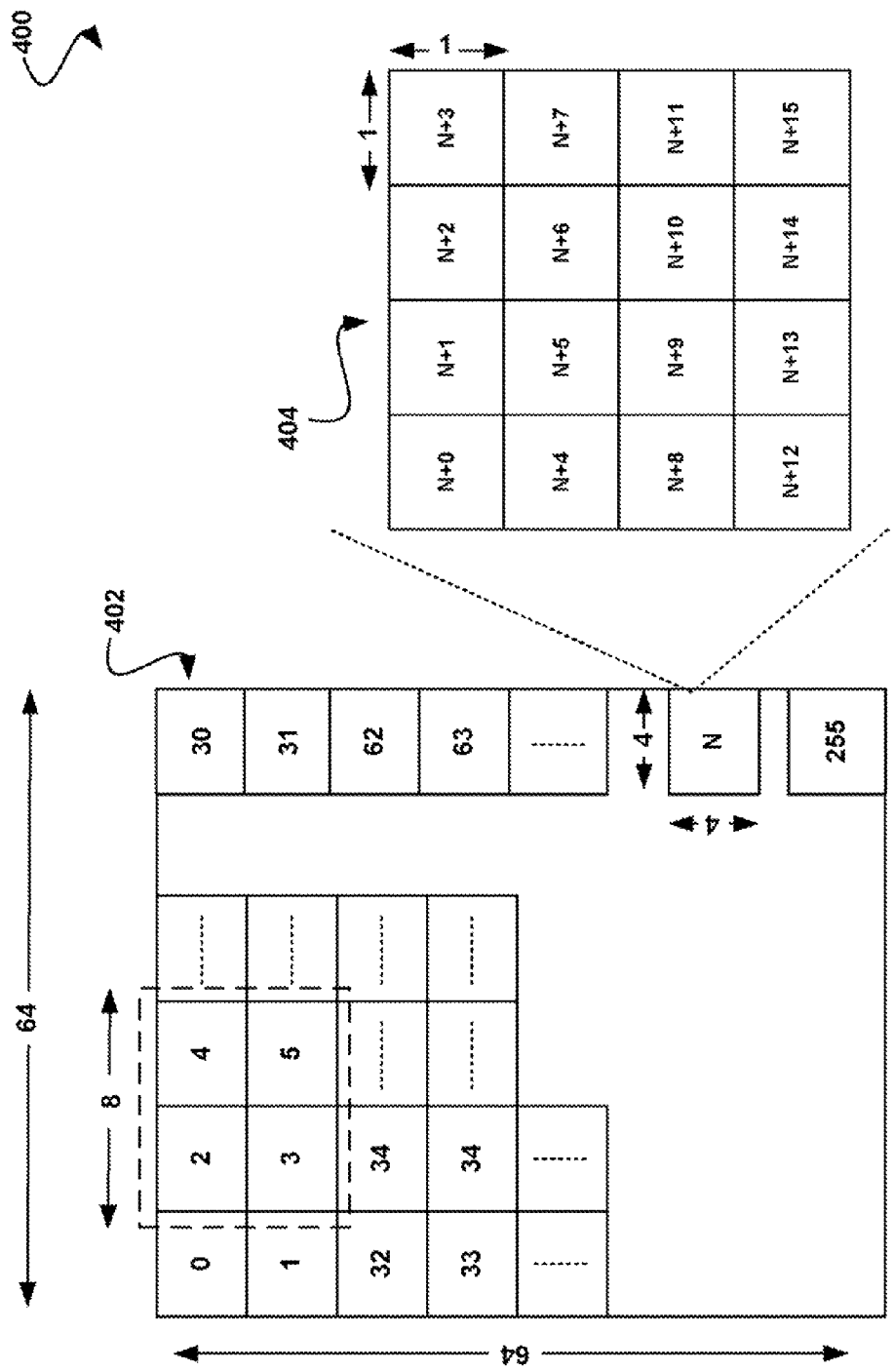
FIG. 4 illustrates a contiguous arrangement of a plurality of portions of memory within a memory block, in accordance with another embodiment.

FIG. 4 illustrates a contiguous arrangement of a plurality of portions of memory within a memory block 400, in accordance with another embodiment. As an option, the memory block 400 may illustrate an exemplary arrangement of the portions of memory described in operation 302 of FIG. 3. Of course, however, the memory block 400 may be implemented in any desired environment. It should also be noted that the aforementioned definitions may apply during the present description.

As shown, the memory block 400 includes a 64×64-byte block of memory. In one embodiment, such memory block 400 may include a film grain image stored within an FGDB. Additionally, the memory block 400 includes a plurality of portions 402. Such portions 402 may include 4×4-byte portions (e.g. blocks, etc.) of the memory block 400. Thus, the portions 402 may include subsets of the memory block 400. As shown, the memory block 400 is partitioned into 256 portions.

Further, each portion 402 is stored in contiguous memory locations within the memory block 400. To this end, each portion 402 of memory (e.g. 0, 1, 2, . . . 255) is contiguous to a plurality of sequentially previous portions of memory and sequentially subsequent portions of memory. Just by way of example, memory portion 2 is contiguous to memory portions 0, 1, 3, 4 and 5, as shown.

In one embodiment, each portion 402 of memory may be associated with a plurality of addresses 404 associated therewith. Each address 404 may include a 1×1-byte block within the portions 402 of memory, for example. Thus, as shown, a 4×4-byte portion of memory may include 16 1×1-byte sub-portions of memory, Just by way of example, memory portion 0 may correlate with memory addresses 0, 1, 2, 3, . . . 15.

As a further option, a plurality of memory blocks 400 may also be stored contiguously in memory. Thus, for example, an FGDB which includes 169 64×64-byte memory blocks each representing film grain images may store such memory blocks contiguously.

Figure 5:
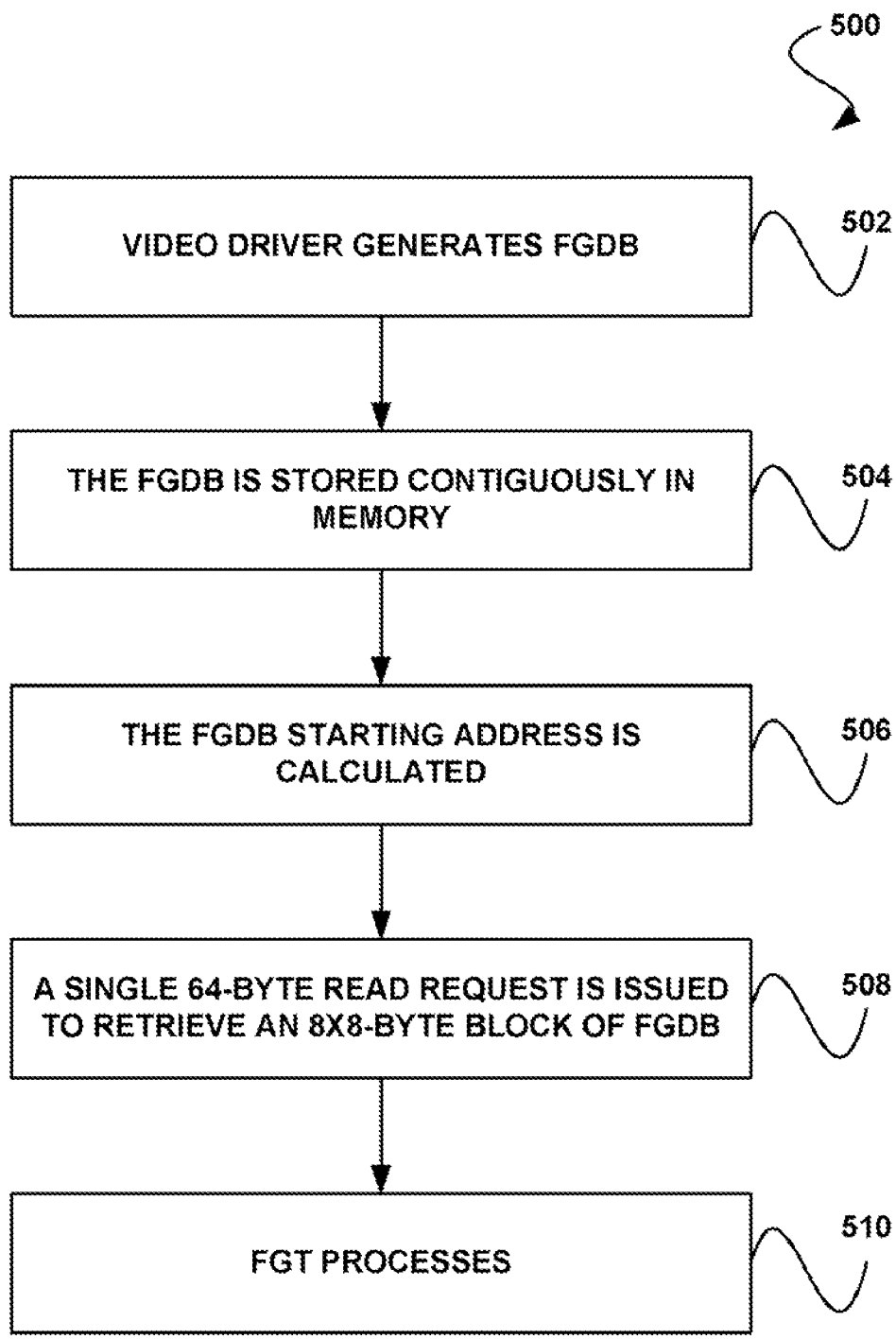
FIG. 5 illustrates a method for reading portions of memory stored contiguously in an FGDB, in accordance with yet another embodiment.

FIG. 5 illustrates a method 500 for reading portions of memory stored contiguously in an FGDB, in accordance with yet another embodiment. As an option, the present method 500 may be implemented in the context of the functionality and architecture of FIGS. 3-4. Of course, however, the method 500 may be carried out in any desired environment. It should also be noted that the aforementioned definitions may apply during the present description.

As shown in operation 502, a video driver generates an FGDB. The video driver may include any logic (e.g. computer code, software driver, etc.) capable of generating an FGDB. Furthermore, the FGDB is stored in memory contiguously, as shown in operation 504. For example, the FGDB may be stored in memory contiguously by storing portions thereof contiguously within memory. Such portions may include portions of film grain images, as described above with respect to FIG. 4.

Additionally, a starting address of a portion of a film grain image is calculated, as shown in operation 506. In the context of the present embodiment, such portion may include a 4×4-byte block of memory within a film grain image. Of course, it should be noted that such dimension is set forth for illustrative purposes only, and should not be consulted as limiting in any manner.

Also, the starting address may include an initial address located within the portion of the film grain image. For example, the portion of the film grain image may include a plurality of address stored therein. With respect to the 4×4-byte block of memory described above, such portion may include 16 1×1-byte addresses stored therein (see item 404 of FIG. 4, for example). Thus, such starting address may include a first address within the 4×4-byte block of memory. In addition, such starting address may be calculated utilizing an index associated with the portion of the film grain image, as an option.

Table 2 illustrates an exemplary equation that may be utilized for calculating an index of the foregoing portion of the film grain image. It should be noted that such exemplary equation is set forth for illustrative purposes only, and therefore should not be construed as limiting in any manner. For example, the index may be calculated in any desired manner.

TABLE 2

$$Idx\_N = l\_offset / 8 * 32 + k\_offset / 4 * 2$$
$$= l\_offset *4 + k\_offset/2$$

With respect to the equation illustrated in Table 2, the l_offset may include the vertical offset in pixels associated with the portion of the film grain sample. In addition, the k_offset may include the horizontal offset in pixels associated with such portion. In the context of the equation in Table 2, the l_offset and the k_offset may optionally be counted from the top left corner of the film grain sample (e.g. top left corner of a 64×64-byte film grain sample, etc.).

Table 3 illustrates an exemplary equation that may be utilized for calculating a starting address associated with the portion of the film grain image. Again, it should be noted that such exemplary equation is set forth just for illustrative purposes, and therefore should not be construed as limiting in any manner.

TABLE 3

$$Addr = X * 4096 + Idx\_N * 16$$

With respect to the equation illustrated in Table 3, the starting address is calculated utilizing the index associated with the portion of the film grain image. In addition, in the context of the equation illustrated in Table 3, $X=(v*13+h)$. Further, v and h may include cut frequencies.

For example, v may include a vertical frequency, whereas h may include a horizontal frequency. In addition, v and h may each include a value from 0 to 12, and may be derived from a database of different combinations of such values. To this end, a starting address associated with a portion of memory may be calculated.

Still yet, a single 64-byte read request is issued in order to retrieve an 8×8-byte block of the film grain image within the FGDB. Note operation 508. In one embodiment, the single 64-byte read request may identify a 4×4-byte portion of the film grain image, utilizing the aforementioned starting address. Moreover, such portion may be utilized for retrieving the 8×8-byte block of contiguous portions of memory associated therewith.

For example, the single 64-byte read request may utilize the calculated starting address (from operation 506) to identify the 4×4-byte portion of the film grain image. To this end, an 8×8-byte block of the film grain image associated with such 4×4-byte portion of the film grain image may be retrieved. Thus, FGT may process the retrieved 8×8-byte block of the film grain image. Note operation 510.

In this way, a single 64-byte read request may only be required for retrieving an 8×8-byte block of memory within a 64×64-byte film grain image stored in an FGDB. To this end, a number of requests for retrieving such block of memory may be reduced. In a further embodiment, a hardware area required for issuing such requests may also be reduced, such that performance may be increased while reducing the amount of area utilized.

Figure 6:
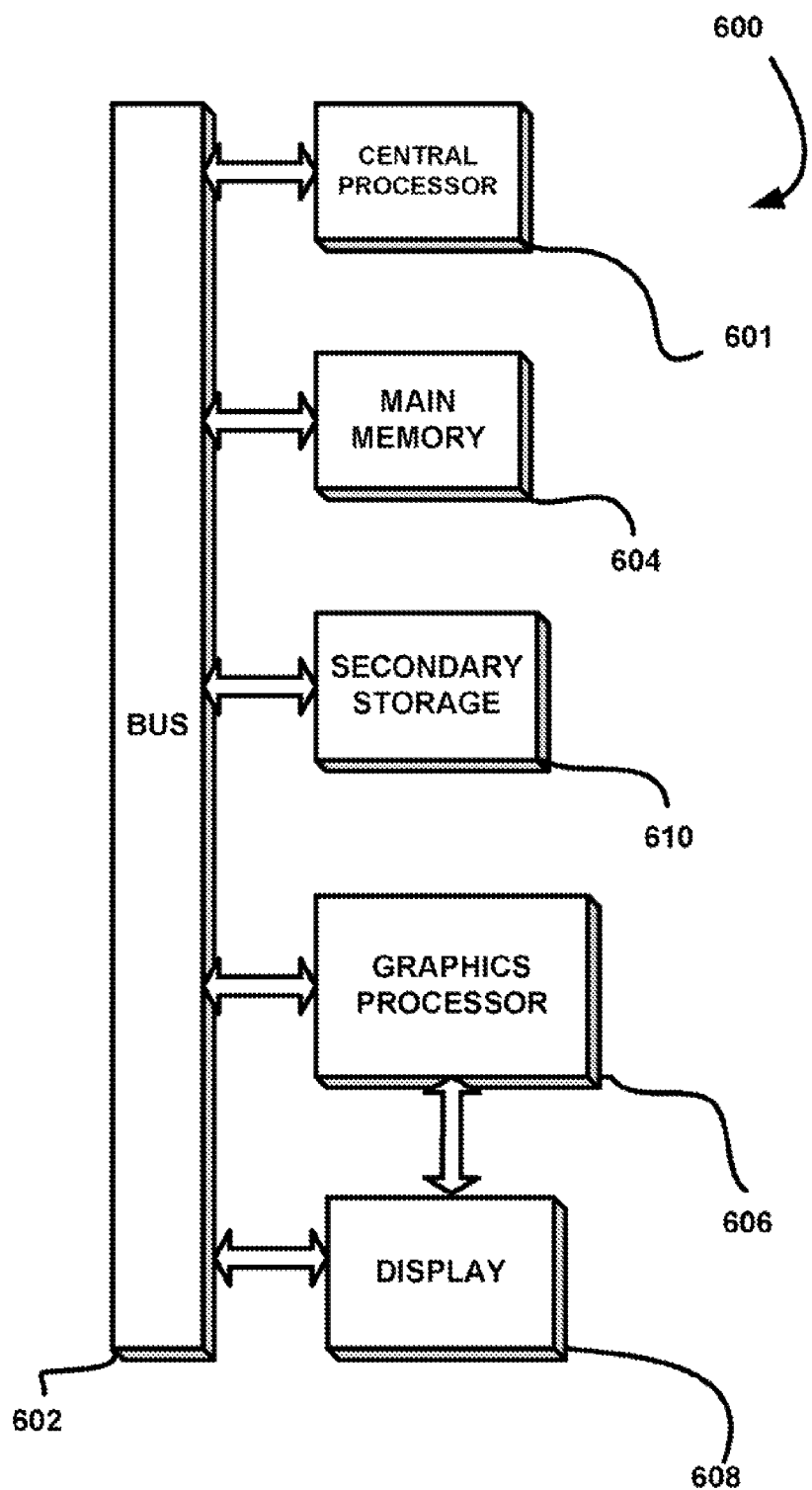
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, a video processor integrated with the graphics processor 606 or separate from the graphics processor 606 (e.g. in an HDTV chip, etc.), an integrated circuit (not shown) that is capable of at least a portion of the capabilities of both the host processor 601 and the graphics processor 606, a chipset (i.e. a group of integrated circuits designed to work and sold as a unit for performing, related functions, etc.), and/or any other integrated circuit for that matter.

Still yet, the architecture and/or functionality of the various previous figures may be implemented in the context of a general system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other

What is claimed is:

1. A method, comprising:
arranging a plurality of portions of memory contiguously; and
reducing a number of requests required to retrieve the portions of memory utilizing the arrangement;
wherein the contiguous arrangement of the portions of memory allow at least a subset of the portions of memory to be retrieved as a block;
wherein the portions of memory are retrieved utilizing an index;
wherein the index is calculated utilizing a single vertical offset and a single horizontal offset of at least one of the portions of memory;
wherein a single address associated with the portions of memory is calculated utilizing the index;
wherein the single address includes a starting address of the portions of memory;
wherein a request to retrieve the portions of memory utilizes the single address.

2. The method of claim 1, wherein each of the portions of memory includes a plurality of memory addresses.

3. The method of claim 1, wherein the memory includes a film grain database.

4. The method of claim 1, wherein the memory includes a film grain image stored in a film grain database.

5. The method of claim 4, wherein a plurality of film grain images are stored contiguously in the film grain database.

6. The method of claim 4, wherein the portions of memory include portions of the film grain image stored in the film grain database.

7. The method of claim 1, wherein the portions of memory include 4×4-byte blocks of the memory.

8. The method of claim 1, wherein the at least a subset of the portions of memory includes sequential memory addresses.

9. The method of claim 1, wherein the block is 8-bytes×8-bytes.

10. The method of claim 1, wherein a single request is utilized to retrieve the portions of memory.

11. The method of claim 10, wherein the single request includes a 64-byte request.

12. The method of claim 1, wherein the requests are issued by a graphics processor.

13. A computer program embodied on a non-transitory computer readable medium, comprising:
driver computer code for arranging a plurality of portions of memory contiguously;
wherein the arrangement results in a number of requests required to retrieve the portions of memory to be reduced;
wherein the contiguously arranged plurality of portions of memory allow at least a subset of the portions of memory to be retrieved as a block;
wherein the computer program is operable such that the portions of memory are retrieved utilizing an index;
wherein the computer program is operable such that the index is calculated utilizing a single vertical offset and a single horizontal offset of at least one of the portions of memory;
wherein the computer program is operable such that a single address associated with the portions of memory is calculated utilizing the index;
wherein the single address includes a starting address of the portions of memory;
wherein the computer program is operable such that a request to retrieve the portions of memory utilizes the single address.

14. A system, comprising:
memory with a plurality of portions of a film grain image arranged contiguously; and
a processor in communication with the memory, the processor capable of issuing requests to retrieve the portions of the film grain image;
wherein the contiguously arranged plurality of portions of the film grain image allow at least a subset of the portions of the film grain image to be retrieved as a block;
wherein the system is operable such that the portions of memory are retrieved utilizing an index;
wherein the system is operable such that the index is calculated utilizing a single vertical offset and a single horizontal offset of at least one of the portions of memory;
wherein the system is operable such that a single address associated with the portions of memory is calculated utilizing the index;
wherein the single address includes a starting address of the portions of memory;
wherein the system is operable such that a request to retrieve the portions of memory utilizes the single address.

15. The system of claim 14, wherein the memory is coupled to the processor via a bus.

16. The method of claim 7, wherein the plurality of portions or memory are arranged contiguously such that four of the contiguous 4×4-byte blocks of the memory are retrieved as a single 8×8-byte block portion.

* * * * *